Feb. 1, 1955   I. W. BRADSHAW   2,700,942
APPARATUS FOR MAKING ARTICLES FROM DOUGH
Filed May 9, 1951   3 Sheets-Sheet 2
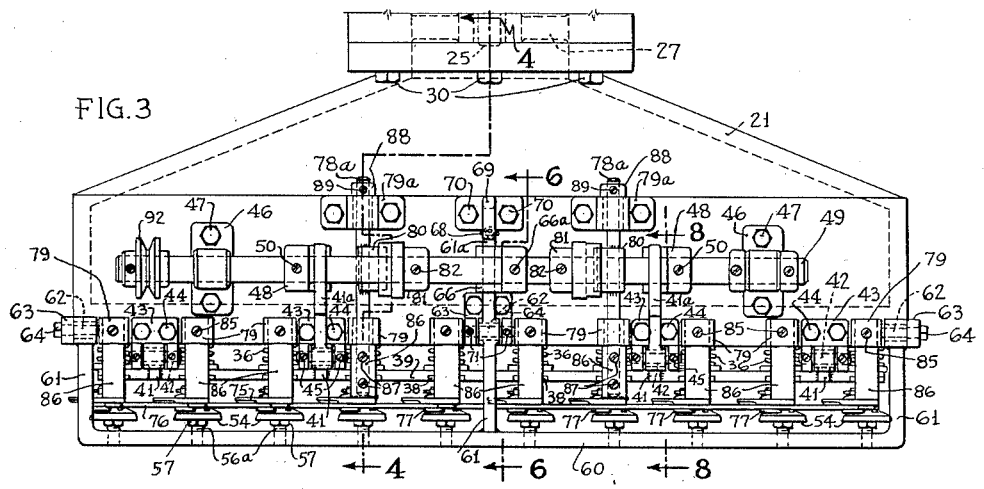
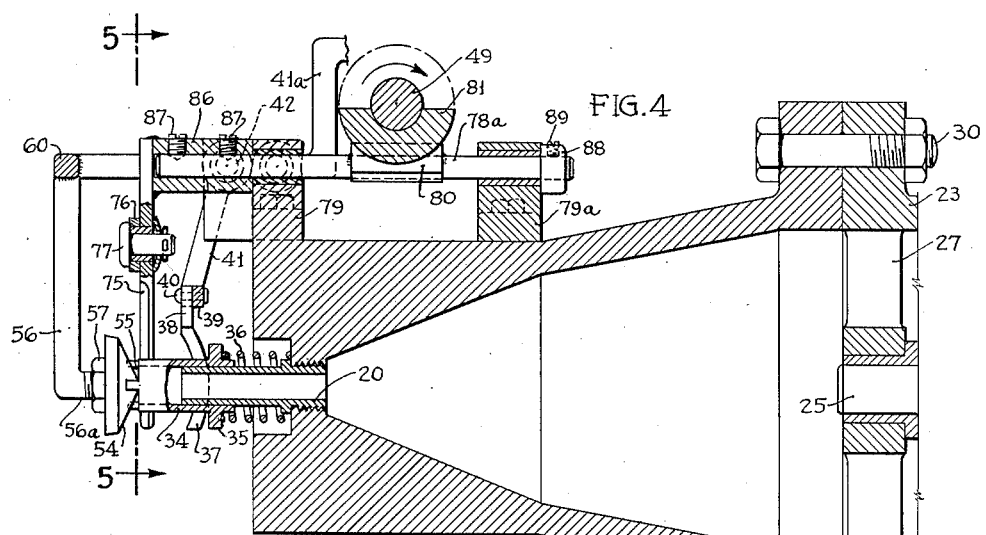
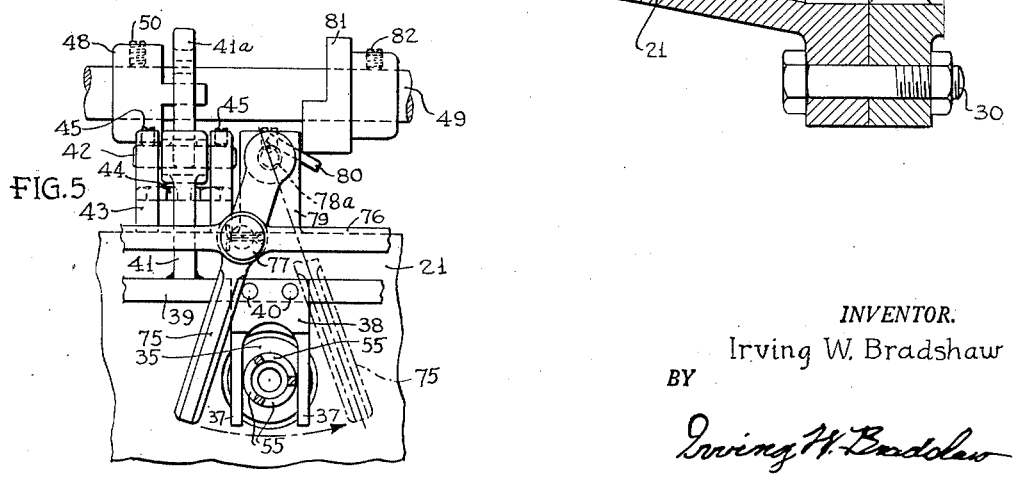
INVENTOR.
Irving W. Bradshaw
BY
Irving W. Bradshaw Feb. 1, 1955     I. W. BRADSHAW     2,700,942
APPARATUS FOR MAKING ARTICLES FROM DOUGH
Filed May 9, 1951     3 Sheets-Sheet 3
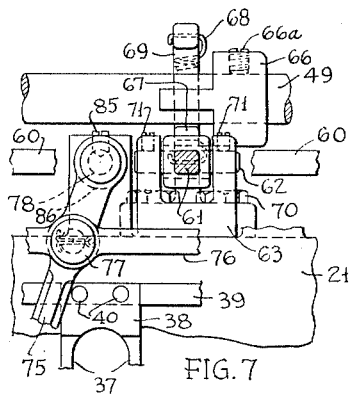
INVENTOR.
Irving W. Bradshaw

United States Patent Office 2,700,942
Patented Feb. 1, 1955

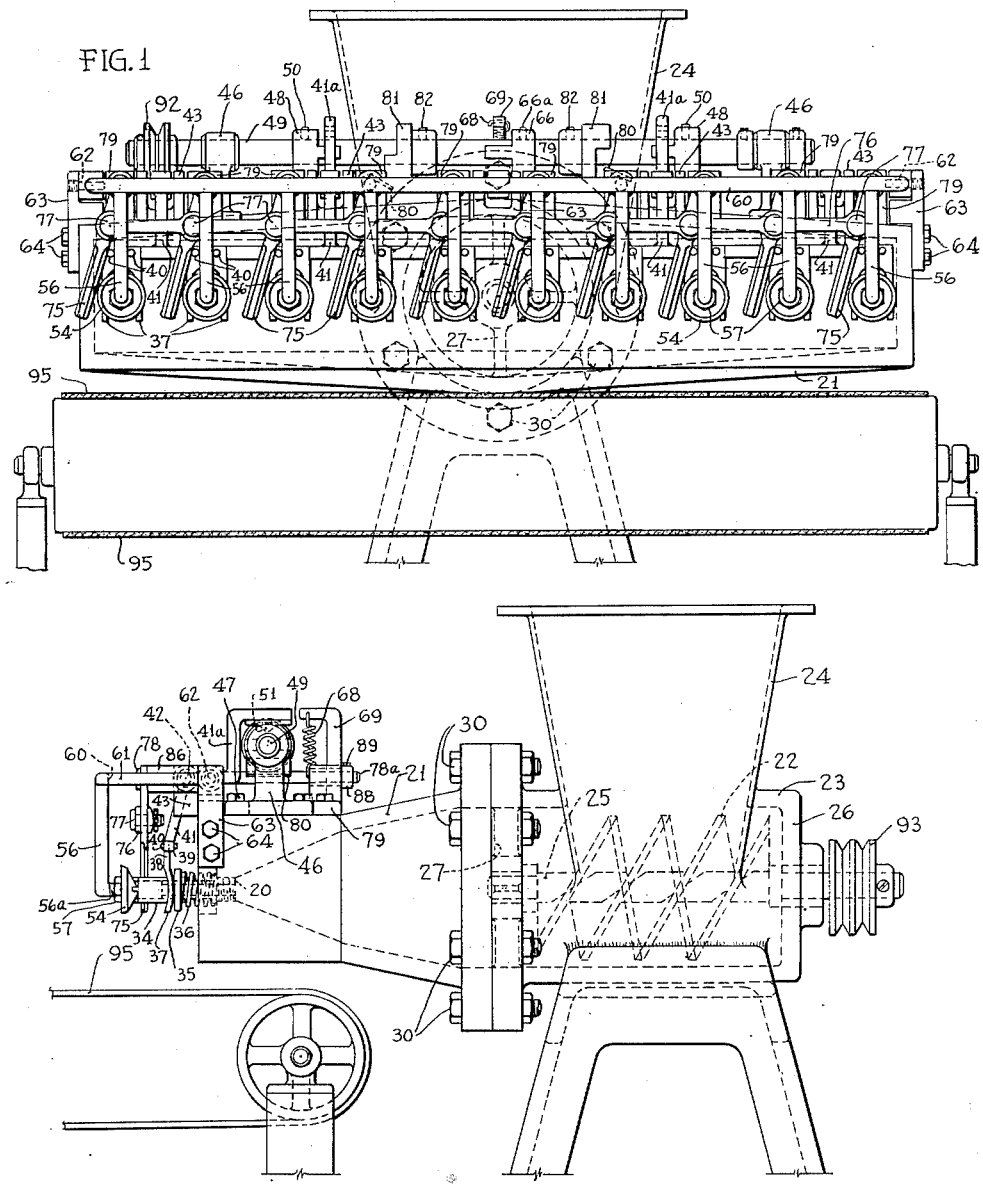

2,700,942

APPARATUS FOR MAKING ARTICLES FROM DOUGH

Irving W. Bradshaw, Philadelphia, Pa.

Application May 9, 1951, Serial No. 225,367

8 Claims. (Cl. 107—14)

This invention relates to apparatus for making plastic articles, especially pastries formed from dough, and has for an object the provision of improvements in this art.

One of the particular objects is to make a plastic article having a foliated bulbous shape resembling popcorn.

Another object is to provide a machine for rapidly forming such articles from a continuous strip of extruded plastic material and rapidly cutting off articles as formed.

Another object is to provide a simple and efficient machine, preferably of multi-unit type, for making the desired articles.

The particular article which is formed is a pastry having the general composition, texture and taste of a pretzel but of relatively small size adapted to be eaten one by one like popcorn and the like. Such an item has proved to be very popular for appetizers and tid-bits for social gatherings. The machine which forms the subject of the present invention is, of course, adapted to make other plastic articles, as will be understood from the following description of an exemplary embodiment thereof, reference being made to the accompanying drawings, wherein:

Fig. 1 is a delivery end view of a multiple unit machine;

Fig. 2 is a side view;

Fig. 3 is a top plan view of the delivery end of the machine;

Fig. 4 is an enlarged vertical section taken on the line 4—4 of Fig. 3;

Fig. 5 is an end view taken on the line 5—5 of Fig. 4;

Fig. 6 is an enlarged vertical section of the upper portion of the delivery end of the apparatus showing the mechanism for operating the spreader, the view being taken on the line 6—6 of Fig. 3;

Fig. 7 is a corresponding end view taken on the line 7—7 of Fig. 6;

Fig. 8 is a vertical section similar to Fig. 6 but showing the mechanism for operating the tube extension or container;

Fig. 9 is a corresponding end view taken on the line 9—9 of Fig. 8;

Fig. 10 is a vertical section similar to Fig. 4 but showing the parts in another stage of operation; and Fig. 11 is a corresponding section taken on the line 11—11 of Fig. 10.

In Fig. 10 the article which is formed by the present machine with one set of forming elements is shown and is referred to by the reference character A. It has bulbous forward foliations A1 and a stem A2.

The plastic material, specifically dough in the example considered, is forced through one or a plurality of tubes 20 from one or a plurality of pressure chambers 21. Here a ten-unit machine is shown in Figs. 1 and 3, a single chamber 21 serving ten tubes from a single pressure producing device, such as a feed screw 22 operating in a tubular chamber 23. A hopper 24 is provided for feeding plastic material to the pressure chamber 23. The feed screw 22 has a shaft 25 which at one end operates in a bearing in the closed end 26 of the chamber 23 and at the other end operates in a bearing carried by a spider 27 mounted in the open end of the chamber 23.

Chamber 21 spreads laterally, as shown in Fig. 3, to supply the ten tubes from the single pressure chamber 23 and its casing is secured to the casing which forms the chamber 23 in a removable manner for cleaning, as by bolts 30.

In Fig. 4 one of the ten forming tubes 20 is shown. It is made to be removable, as by being screwed into the end of the casing which forms the pressure chamber 21, to provide for the use of tubes of different size or shape.

Surrounding the tube 20 and slidable thereon there is mounted a tubular container sleeve 34 into which the plastic material flows from the tube 20. The sleeve 34 is provided with an annular flange 35 which on the inner side is engaged by a spring 36 which urges the sleeve outward. The sleeve is restrained against undue outward movement and is reciprocated against the spring 36 in timed synchronism with the movement of other parts by the forked end 37 of an arm 38 which, like the others for other tubes, is secured to a gang bar 39, as by rivets 40. The bar 39 is carried by a plurality of arms 41 which are pivoted on shafts 42 carried by brackets 43 which are secured, as by cap bolts 44 to the casing of chamber 21. There are four shafts 42 and brackets 43 in the machine illustrated. The shafts 42 are shown to be secured to the brackets 43, as by set screws 45.

Two of the arms 41 have rigidly secured with them extension arms 41a which are actuated in one direction against all of the springs 36 by two cams 48 secured to a cam shaft 49, as by set screws 50. The cam shaft 49 is turnably mounted on pedestals 46 which are secured to the casing of chamber 21, as by cap screws 47. Fig. 8 shows one of these cams 48 as comprising two opposite lobes separated by concentric arcuate portions. The arm 41a is provided with a cam follower 51 which rides on the cam. The two cams 48 are identical and secured in the same position on the shaft so as to give a balanced action to the gang bar 39 and all of the forked arms 38 carried thereby.

Cooperating with the outer end of each tubular container sleeve 34 there is a conical spreader 54. The end of the sleeve 34 is slotted, as at 55, to cause the bar, strip, or ribbon of plastic material to divide into several branches or foliations as it comes against the conical spreader 54.

The spreader 54 moves in and out in timed relationship with the reciprocatory movements of the sleeve 34. As shown, the spreader 54 is threaded on the inturned end 56a of an arm 56 and a locknut 57 holds the spreader accurately in adjusted position.

As shown in Fig. 6, the arms 56 are carried by a gang bar 60 which is provided with a plurality of arms 61 (three shown) pivoted on shafts 62 carried by brackets 63 secured to the casing of chamber 21, as by cap bolts 64. One of the arms 61, the center here, is provided with a rigid extension arm 61a which is operated by a double-lobed cam 66 secured on the shaft 49, as by a set screw 66a. The arm 61a is provided with a cam follower 67 and is held against the cam by a spring 68 carried by a bracket 69 secured to the casing of chamber 21, as by cap bolts 70. It is to be noted that the two end shafts 62 (Fig. 3) are screwed into the brackets whereas the middle shaft 62 is secured by set screws 71; also that the cap bolts 64 for the two end brackets are secured in the end of the casing, whereas the cap bolts for the center bracket are secured in the top of the casing.

The cam 66 is in phase with the cams 48 but the actuated parts are so arranged that the tubular container sleeve 34 moves out as the conical spreader 54 moves in so that they come together to cause dough to extrude between the slots 55 of the sleeve and out along the conical surface of the spreader. Then the sleeve and spreader separate, the sleeve moving in and the spreader moving out to leave a short cylindrical portion or stem of the extruded body of dough exposed beyond the end of the sleeve 34.

Means are provided for cutting off this cylindrical stem in timed relationship with the operation of the forming elements. The cut-off means illustrated comprises a double-bladed knife 75 which cuts off one article while moving in one direction and cuts off another article at the same tube while moving back in the opposite direction. There is a separate knife for each set of forming devices, ten here, and these knives are all connected together, as by a gang bar 76 and pivot pins 77. Each knife is carried by a pivot pin or shaft 78 in a bracket or pedestal 79 secured in any convenient manner to the casing of chamber 21. Two of the pivot pins 78 are extended rearwardly as shaft extensions 78a (Figs. 3 and 4) and carry cam follower plates 80 (Fig. 5) secured thereon (as by welding) in position to cooperate with cams 81 secured on shaft 49, as by set screws 82.

The two cams 81 are alike but set on shaft 49 in opposite phase and the operated parts are so arranged that one cam moves the knives in one direction at one half-rotation of the cam shaft and the other cam moves the knives in the other direction at the other half revolution of the cam shaft, there being a quick movement of the knives for each of the two strokes and a long pause at the end of each stroke while the articles are being formed. As clearly shown in Fig. 4, the long pause is caused by the extensive concentric portions of the cams. There is a slight period of time between the actions of the two cams to avoid interference in their actions.

In the particular arrangement illustrated, all of the shafts 78 except those which are extended as shafts 78a are rigidly secured to the brackets or pedestals 79, as by set screws 85, the sleeves 86 of the knives turning on the fixed stud-like shafts; whereas the shafts which are extended as shafts 78a are turnable in bearings in the pedestals 79 and in bearings in supplemental pedestals 79a, the sleeves 86 of two knives being secured to the two shafts 78a, as by set screws 87. Collars 88 secured to the shafts 78a, as by set screws 89, retain the shafts in proper position.

The cam shaft 49 is provided with a drive pulley 92 and the screw feed shaft 25 is provided with a drive pulley 93, these pulleys being operated by common driving means (not shown). They do not necessarily have to maintain a fixed speed ratio because the feed screw only creates pressure for extruding the plastic material but does not positively force it out, whereas the cam shaft positively associates together all of the mechanical devices which have to operate in synchronism and has no restricted relationship in operation to the feed of plastic material.

As the articles are cut off they drop down upon a conveyor belt 95 which carries them to an oven or to such other place as may be desired.

In operation, the screw conveyor constantly urges plastic material (dough) into the pressure chamber and it passes out the several tubes in a plurality of strips or ribbons. The container sleeves or tubular extensions move outward as the spreaders move inward and the strips of material are divided to foliations by the notches in the end of the tubular extensions in cooperation with the smooth conical surfaces of the spreaders. The spreaders and tubular extensions then move apart and the knives move across to cut articles off the strips at the ends of the tubular extensions. The knives make one back and forth movement for each revolution of the cam shaft while the spreaders and tubular extensions make two back and forth movements during the same period. This avoids having the knife travel twice across the path of the issuing strip for a cutting action.

The material tends to curl and become bulbous on the ends of the foliations with the result that the articles very much resemble popcorn in size and shape. When buttered, salted and baked they make very palatable morsels.

While one embodiment of apparatus for making one form of article has been illustrated and described, it is to be understood that there may be various embodiments of each within the general scope of the invention.

What is claimed is:

1. A machine for forming plastic articles comprising in combination, a forming tube through which a strip of plastic material is extruded, a spreader movable in timed strokes toward and from the end of the tube as the strip of material emerges, cooperating means between the tube and spreader for dividing the strip into a plurality of branches, and means operating in timed relationship with the movement of the spreader and movable across the end of the tube when the spreader has been moved away from the end of the tube for cutting articles off the strip when the spreader is moved away from the end of the tube.

2. A machine for forming plastic articles comprising in combination, a forming tube, means for forcing a strip of plastic material through the tube, a conical spreader, means for moving the spreader in timed strokes toward and from the end of the tube, cooperating means between the tube and spreader for dividing the strip of material, and means for cutting off articles from the strip adjacent the end of the tube when the spreader is moved away from the end of the tube.

3. A machine for forming plastic articles comprising in combination, a forming tube, means for forcing a strip of plastic material out of the tube, a smooth conical spreader disposed in front of the end of the tube, means for moving the spreader in timed strokes toward and from the end of the tube, means on the tube for dividing a strip in cooperation with the spreader into a plurality of branches, and means operating in timed relationship with the movement of the spreader and movable across the end of the tube when the spreader has been moved away from the end of the tube for cutting articles off the strip when the spreader is moved away from the tube.

4. A machine for forming plastic articles comprising in combination, a tube through which plastic material is extruded, said tube including a tubular extension reciprocable thereon, means for reciprocating said tubular extension, means for forcing a strip of material out of said tube, a spreader, means for moving the spreader toward and from the end of the tube, a knife for cutting off articles from the strip when the spreader is moved away from the end of the tube and when the tubular extension is moved inwardly on said tube.

5. A machine for forming plastic articles comprising in combination, a tube through which plastic material is extruded, means for forcing plastic material out of said tube, a tubular extension reciprocable on the tube, means for reciprocating said tubular extension, a spreader and means for moving the spreader toward and from the tubular extension in synchronism with the movement of the tubular extension so they converge at the same time and separate at the same time, means between the tubular extension and spreader for dividing the plastic strip into a plurality of branches, and a knife with means for operating it in timed relationship with the operation of the spreader and tubular extension for cutting off articles at the end of the tubular extension when it is retracted and at a place where the strip is not divided.

6. A machine as set forth in claim 5 wherein the means for operating said spreader, tubular extension and knife comprises a single shaft with a plurality of camming elements thereon.

7. A machine for forming foliated plastic articles comprising in combination, an extruding device, a casing connected to the outlet of said extruding device for spreading the flow of material laterally, a plurality of extrusion tubes in said casing for delivering a plurality of strips of plastic material, a reciprocable tubular extension on each tube, the outer end of each tubular extension being serrated to divide the strip into branching foliations, a spreader movable toward and from each tubular extension for spreading the foliations, a double-acting knife for each tube movable at times across the path of the strip for cutting articles from it, a common cam shaft, gang means connecting all of said tubular extensions, gang means connecting all of said spreaders, gang means connecting all of said knives, means on the cam shaft associated with said gang means for operating the knives back and forth once each revolution and operating the tubular extensions and spreaders back and forth twice each revolution, and a common conveyor beneath all of said tubes for removing articles as cut off.

8. A machine for forming plastic articles comprising in combination, a forming tube through which plastic material is extruded, means for forcing plastic material through the tube, a spreader mounted wholly outside the tube in a position to cooperate with the end of the tube and movable in timed strokes from and toward the outer end of the tube from which the material emerges to spread it, and a cutter mounted to sweep transversely across the end of the tube between the spreader and tube end when the spreader is disposed at a distance away from the end of the tube and movable in timed relationship with the movements of the spreader for cutting off articles or pieces as formed from the strip of extruded material and spread by the spreader.

References Cited in the file of this patent

UNITED STATES PATENTS

| 1,447,166 | Alumbaugh | Mar. 6, 1923 |
| 1,850,723 | Kolliker | Mar. 22, 1932 |
| 2,558,887 | Tesiero | July 31, 1951 |
| 2,625,891 | Nagel | Jan. 20, 1953 |